Aug. 7, 1956 H. FREEMAN ET AL 2,757,582
SEPARATION OF GAS AND UNDESIRED PARTICLES FROM LIQUIDS
Filed April 27, 1954 4 Sheets-Sheet 1
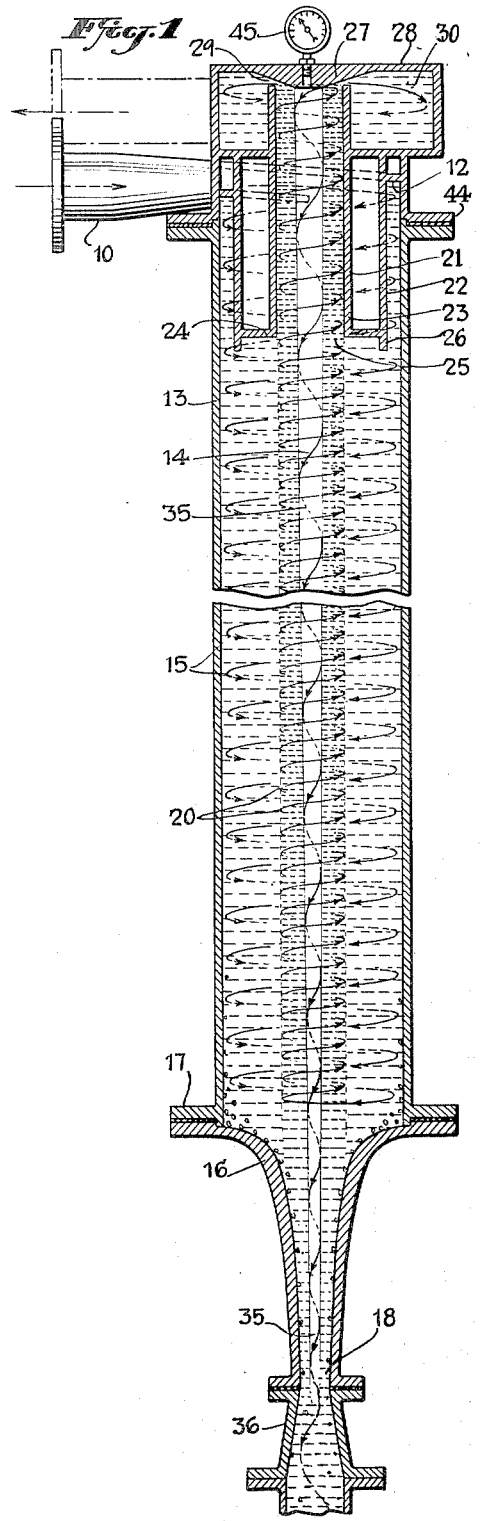
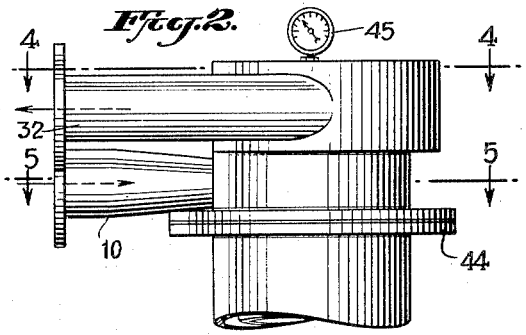
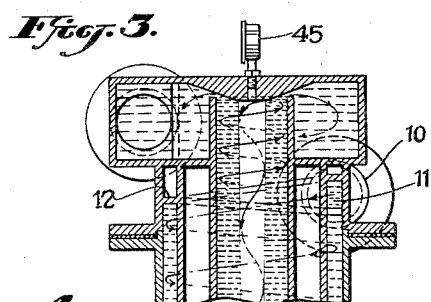
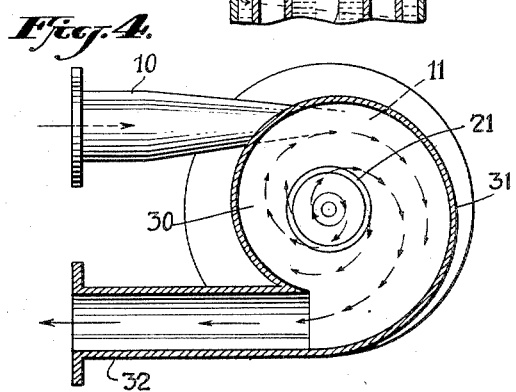
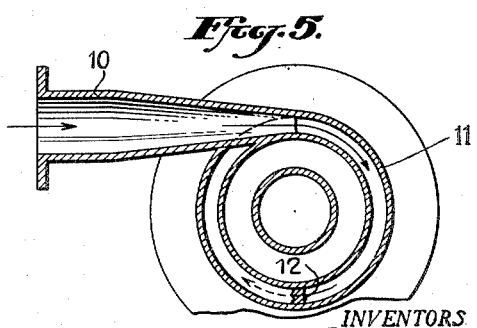
INVENTORS
HORACE FREEMAN
JOHN D. BOADWAY
BY
*Ward, Neal, Haselton, Orme & McElhannon*
ATTORNEYS.

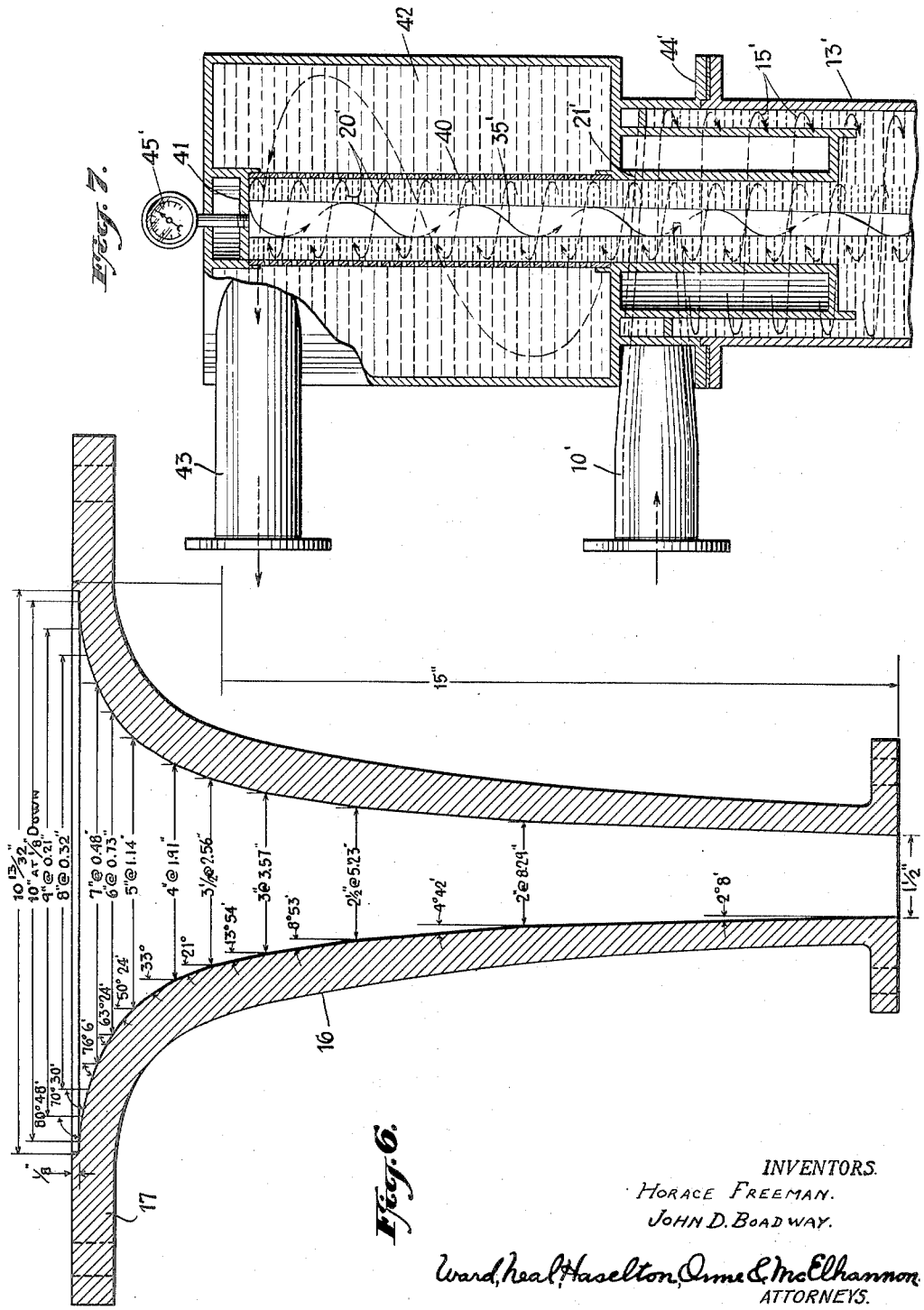

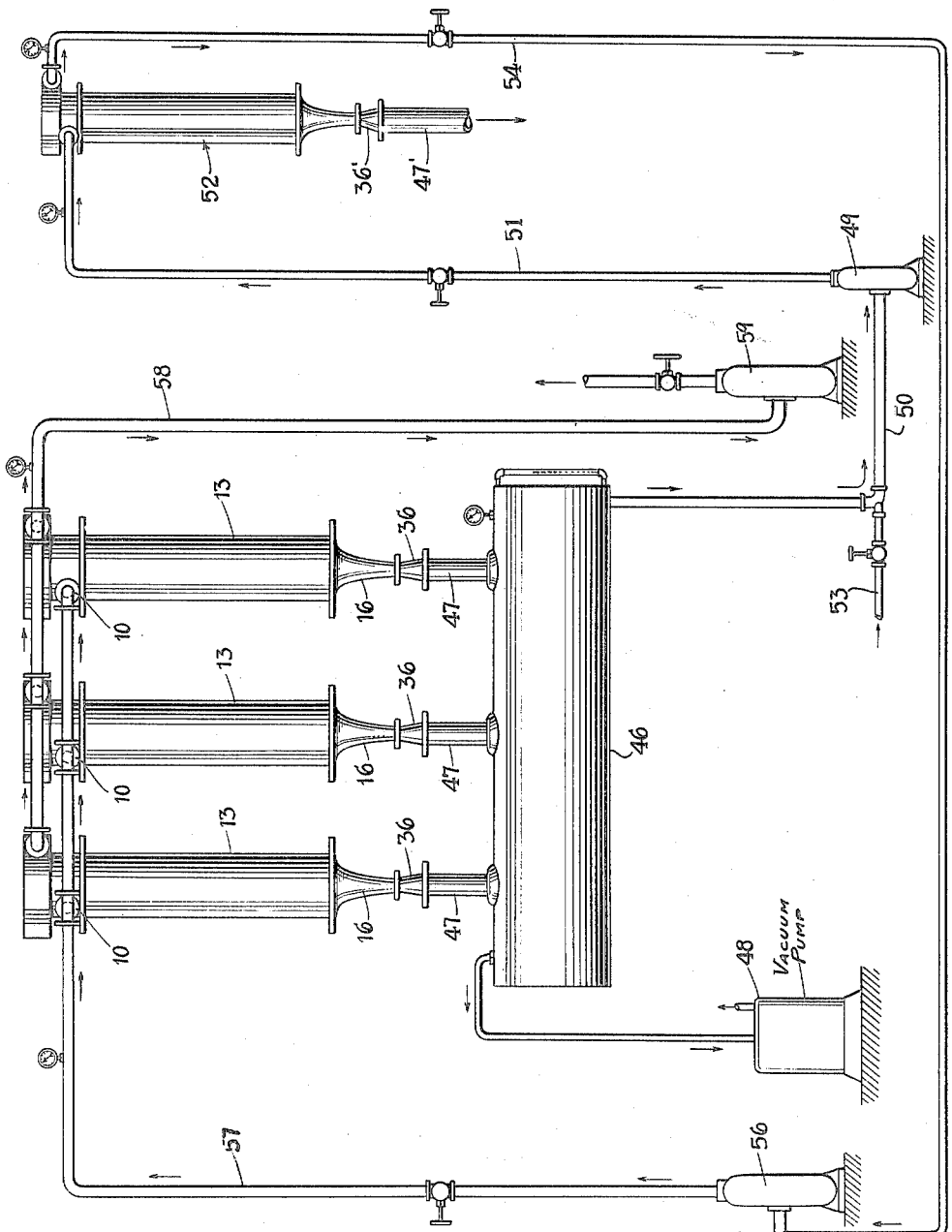

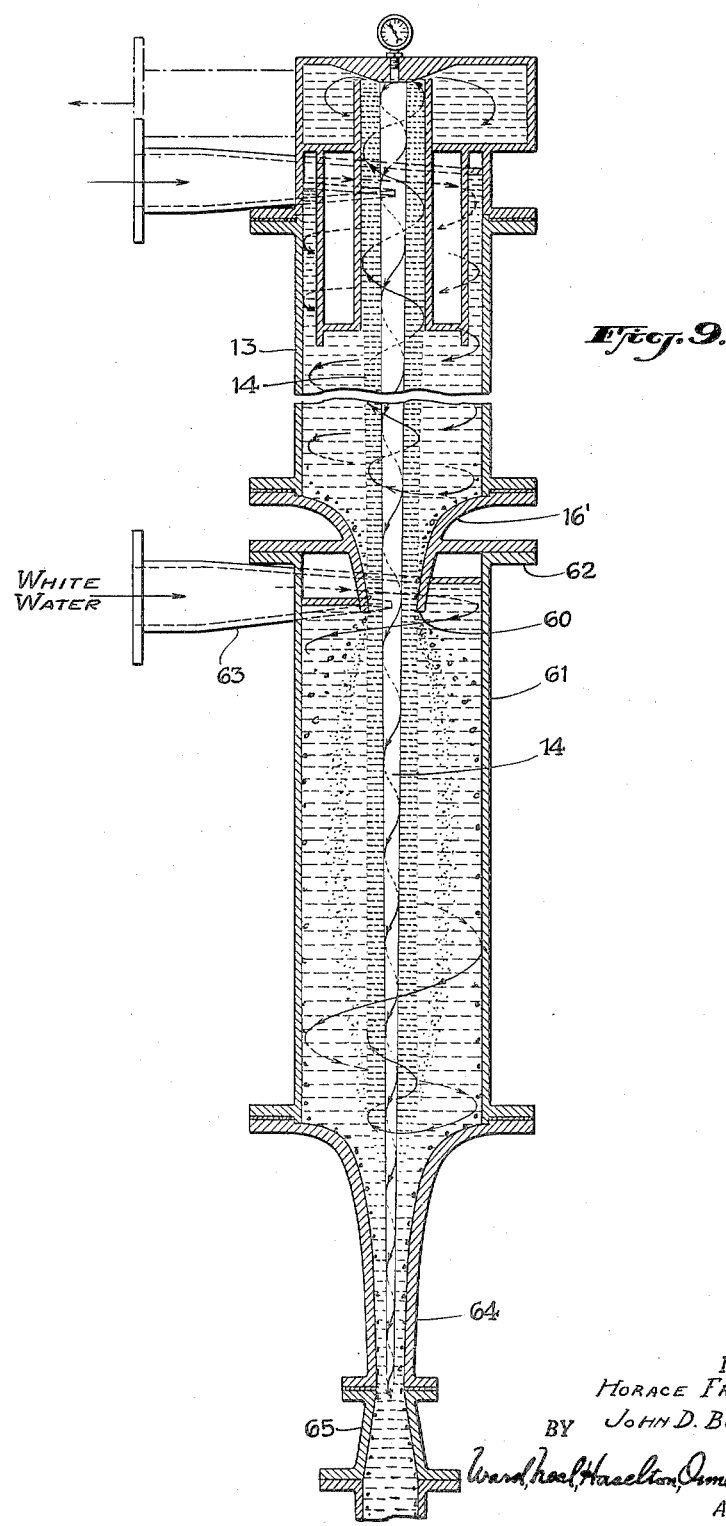

United States Patent Office 2,757,582
Patented Aug. 7, 1956

2,757,582

SEPARATION OF GAS AND UNDESIRED PARTICLES FROM LIQUIDS

Horace Freeman, Cap-de-la-Madeleine, Quebec, and John D. Boadway, Three Rivers, Quebec, Canada, assignors, by mesne assignments, to Nichols Engineering and Research Corporation, New York, N. Y., a corporation of Delaware Application April 27, 1954, Serial No. 425,942

9 Claims. (Cl. 92—28)

This invention relates to improved methods and apparatus for separating gas and undesired particles from liquids and liquid mixtures, the invention being particularly adapted, among other possible uses, for the treatment of paper pulp suspensions.

Vortex type separators have for some time been in extensive use for removing heavy undesired particles such as dirt from liquid or liquid suspensions such as paper pulp suspensions. In certain of applicants' prior patent applications, vortex type separators have been disclosed of a construction adapted for introduction of the liquid at high velocity and under conditions such as to maintain a stabilized low pressure core of gas within the vortices of the devices, viz. applicants' U. S. applications Serial No. 314,248, filed October 11, 1952, Serial Nos. 324,561, 324,562, filed December 6, 1952 and Serial Nos. 331,061 and 331,062, filed January 13, 1953, reference to which is hereby made. With the arrangements of said applications, gases which are dissolved in the liquid being treated, as well as those which are adsorbed on solid particles in liquid suspensions, together with bubbles, may be removed if the liquid leaving the apparatus is discharged to a vacuum and the vacuum core is maintained at a substantial subatmospheric pressure. For the removal of gases from solution in such apparatus, it is important to maintain the liquid at low pressure for a sufficient time in order that the gases will come out of the solution to form bubbles and then be displaced to the evacuated core. The bubbles as formed in the liquid, migrate under the effects of centrifugal force rapidly toward the evacuated core, and tend to carry with them particles which adhere to bubbles such as a fats, oily matter or any particles with a surface which does not wet well with the liquid present.

The present invention involves improved methods and arrangements of apparatus which make possible more efficient removal of heavy particles such as dirt from liquid suspensions as well as gas bubbles and dissolved and adsorbed gases, together with oily and undesired flotable matter.

More particularly the invention in its preferred form involves an improved vortex type separator in which the liquid or suspension being treated is caused to flow first as an outer vortex travelling for a substantial distance in one direction, then reversing. At the region of its reversal, the heavy particles such as dirt will have largely been thrown by centrifugal force to the periphery of the vortex and accordingly at this reversal point, a small amount of the flow referred to as "rejected stock" is discharged. The remaining part of the flow which is reversed at this point, forms an inner vortex from the outer part of which, after following an extended path of travel, the desired treated liquid or suspension is withdrawn while a small portion containing some of the undesired particles and entrained bubbles is again reversed to form a third and innermost vortex surrounding a gas core. The material of such innermost vortex is finally withdrawn at the first reversal point along with the above-mentioned "rejected stock" in such way as to maintain the gas core in the vortices and the vortex liquid near the gas core, under subatmospheric pressure.

This improved method involving a "three-way" vortex and the apparatus for carrying out same, has proven more economical, efficient and reliable than any prior means for removing from pulp suspensions, not only the undesired heavy dirt particles and all undesired gases, but also certain undesirable flotable material such as pieces of pitch, Carborundum dirt and bark pieces. Furthermore, the necessary equipment is such that it may largely be installed within the usually rather limited space which heretofore was required for vortex separators which only acted to separate dirt.

Various further and more specific objects, features and advantages of the invention will appear from the detailed description given below taken in connection with the accompanying drawings which form a part of this specification and illustrate merely by way of example, preferred forms of apparatus for the practice of the invention. The invention consists in such novel features, arrangements and combinations of parts and method steps as may be shown and described herein.

In the drawings:

Fig. 1 is a vertical sectional view of the improved vortex separator of the present invention in its presently preferred form;

Fig. 2 is an elevational view of the upper portion of Fig. 1;

Fig. 3 is a vertical sectional view of the upper portion of Fig. 1, this view being taken at right angles to the view of Fig. 1;

Figs. 4 and 5 respectively are horizontal sectional views taken substantially along lines 4—4 and 5—5 respectively of Fig. 2;

Fig. 6 is an enlarged vertical sectional view of one of the lower portions of the apparatus of Fig. 1;

Fig. 7 is a vertical sectional view of an alternative construction for the upper portions of the separator;

Fig. 8 is a somewhat diagrammatic view illustrating how, in a preferred way, among other possible ways, a plurality of the separators as of Fig. 1 (or Fig. 7) may be connected for efficient operation with pumping equipment and with a secondary vortex type separator.

Referring now to Figs. 1–5 and the operation of the construction there shown in further detail, the liquid or liquid suspension to be treated enters tangentially through a nozzle as at 10 which is shaped to restrict the flow to one having a slot like cross-section as shown at 11 (Fig. 3). The incoming flow is guided around the entry region by a one-turn spiral guide 12, the flow being so restricted preferably that somewhat more than 50% of the inlet pressure energy is converted into velocity energy and such that in a cylindrical vortex chamber 13, the liquid is caused to maintain a helical downwardly flowing vortex around on the inside wall of the chamber and leaving a gas space 14 at the center along the axis of the chamber.

After about 30 or more revolutions of the helical flow, as indicated by the helical series of arrows 15, the liquid meets a cone 16 having inwardly curved walls. That is, as shown, this cone member, which may have at its upper end a suitable flanged connection as at 17 to the lower end of the chamber 13, is so shaped on its interior surface that it turns back that part of the treated liquid which has, at some distance from the wall surface of the chamber 13, lost little of its energy by shear, but not the liquid which has been closely adjacent the wall surfaces and has consequently lost substantial energy by shear against the walls. The latter liquid passes on down together with the heavy dirt which has been thrown toward the walls, along the curved cone and out, as a stream of annular cross section through a discharge opening 18 at the bottom. To accomplish this result, the curvature of the interior surface of the cone 16 as hereinafter more fully described, is such that at its upper portions, its diameter rapidly diminishes downwardly, but gradually toward the lower portions the restriction in diameter is less and less pronounced.

The treated liquid turned upwardly by the sloping cone surfaces, forms a helical flow 20 inside of and surrounded by the downward vortex and extends to a top outlet of a "vortex finder" 21. This may comprise an annular structure having an outer wall 22 about which the incoming vortex 15 circulates and an inner wall 23 forming a cylindrical space which receives the upward vortex 20. The lower ends of the walls 22, 23 may be sealed with respect to each other as by an annular plate 24 formed with a central aperture 25 through which the upward vortex flows, its path being separated by the plate 24 from the greater part of the incoming downward vortex, which separation may be further assured by forming the cylindrical wall 22 with a downward projection 26.

As appears in Fig. 1, the central opening in the vortex finder is large enough readily to accommodate the upflowing liquid as well as the central gas core 14. The upper end of the vortex 20 meets a blunt conical formation 27 on the underside of a top plate 28 and such blunt cone is so shaped and positioned as to leave an annular crevice at 29 through which the treated liquid or stock leaks or escapes into a chamber 30. As indicated in Fig. 4, the chamber 30 is so shaped, with its outer wall 31 conforming to an equiangular spiral for example, that the liquid swirls around an expanding path and thence out through a tangential outlet 32. In passing through and out of chamber 30, the treated liquid or "accepted stock" has a substantial part of its velocity energy reconverted again to pressure energy so that in some cases if desired, despite the maintenance of an evacuated core in the apparatus, the stock may be discharged at a positive pressure.

When the liquid of the upward vortex 20 meets the blunt conical surface 27, the direction of flow of the inner portions, together with any bubbles and frothy liquid, are directed downwardly again as a third and innermost helical flow, as indicated by the helical line 35. This innermost vortex 35 passes down and out at the bottom through the opening 18 within the annular stream of rejected dirt containing stock there being withdrawn. The swirling rejected liquid, together with the gas, is discharged through a connection 36 which preferably is shaped to allow the stream to expand, thus sweeping the gas with it and maintaining a subatmospheric pressure in the core 14 by reason of the resulting eductor effect.

In Fig. 7, an alternative form of headpiece construction for the top of the device is shown, although the form shown in Fig. 1 is presently preferred. In the form shown in Fig. 7, the stock to be treated enters through inlet 10' tangentially into the cylindrical chamber 13'. The vortices occur as at 15', 20' and 35' like those above described, but in Fig. 7 the accepted stock, instead of passing out of the vortex finder through a crevice as at 29 in Fig. 1, here passes out through perforations in a cylindrical upper extension 40 of the vortex finder 21'. The innermost downward vortex is formed by reason of the impingement of the upward vortex upon a plate as at 41 or equivalent means within the top of the device. The perforated cylinder 40 constitutes in effect a screen with coarse mesh allowing the pulp particles to pass through, but tending to prevent passage therethrough of undesired coarser particles, gas bubbles and froth, which may eventually be swept up to the plate 41 and thence returned downwardly for discharge with the rejected material. The accepted stock passes out into a chamber 42 and thence to an outlet 43. The whole head portion of Fig. 7 may be detachably connected as by flange means 44' to a cylinder 13'. Similarly, the head portion of the device of Fig. 1 may be detachably connected as by flange means 44 suitably bolted or clamped together so that one headpiece may be replaced by the other or removed for cleaning or repair. The bottom cone 16 may similarly be detachably secured.

Pressure gauges as at 45, 45' may be connected to communicate with the upper end of the evacuated cores for indicating the degree of subatmospheric pressure being maintained therein.

It will be understood that while the various embodiments of the separators herein disclosed are described as mounted in upright positions as shown in the drawings, same may in some cases be mounted at various angles as compared with their positions as shown in the drawings, particularly if the vortex velocities are high enough so that the effect of the force of gravity thereon is not too great. Accordingly, terms such as "upper," "downward" and "lower end" are used herein for convenience in identifying the relative locations and directions in the devices, but without intending to limit the uses of the devices to the particular upright positions shown.

The devices as above described may be used without connection of any vacuum sources thereto, in which event there will be a positive discharge pressure down through the connection 36, and the undesired solid particles or dirt, along with gas bubbles and some froth, may be there discharged at atmospheric pressure, although under these conditions, the system can remove very little dissolved gas from the liquid being treated. Usually, however, it will be desired to remove such dissolved gases as well as gases adsorbed on particles or fibers in the suspension, and in that case it is necessary to apply a vacuum connection to the lower end of the device. As shown in Fig. 8, for example, three of the separators may have their lower ends discharging into a tank 46 through pipes 47, the space within the upper portion of this tank being connected to a vacuum pump 48. The liquid mixture of rejected stock in the lower part of the tank 46 may be withdrawn by a pump 49 through a pipe 50 for pumping the rejected material through pipe 51 to a secondary cleaner 52, which may be of the same construction as shown in Fig. 1. Preferably white water is admitted through a valved connection 53 for diluting the rejected stock before it goes to the secondary pump.

With such discharge of the rejected material from the separators under vacuum into a tank such as at 46 for separating the discharged gases from the discharged rejected liquid material, it is possible to separate in the main separators as much of the dissolved and adsorbed gases as may be desired, along with the dirt, bubbles and froth.

The secondary separator 52 may be operated with a vacuum connection at the lower end as in the case of the main separators if desired, or if preferred, the secondary unit may discharge to atmospheric pressure, with reliance on the eductor effect in the expanding discharge connection 36' to cause some subatmospheric pressure to be maintained in the secondary separator, whereby the bubbles, froth and dirt will be discharged therefrom through connection 47' to waste, or to means for further treatment thereof. The accepted liquid or stock from the secondary separator is conducted through pipe 54 back to an intake connection 55 of a pump 56 for pumping the untreated liquid or stock through pipe 57 to the inlets 10 of the primary separators. The treated accepted liquid or stock from these separators may be discharged through a connection 58 and through a primary outlet pump 59 to the point of use of the treated material, for example to a paper machine in the case of pulp suspensions.

All of the principal pipe connections above referred to may as shown, be provided with valves for adjusting the rate of flow therethrough as well as with pressure gauges as indicated.

In Fig. 9, an alternative arrangement is shown for discharging the rejected stock from the separator. The structure at the upper part of this figure is the same as that of the separator of Fig. 1 except that the lower end of the cone 16' is terminated at 60. The cone 16' is positioned in a cylindrical chamber 61 having a flanged connection as at 62 with the cone. The chamber 61 has a tangential restricted inlet 63 through which white water or other water used to dilute the rejected stock may be introduced. The purpose of this arrangement is to increase somewhat the eductor effect down through the outlet of the cone 16' and at the same time inject through the inlet 63 the necessary liquid for diluting the rejected stock before it goes to a secondary separator, and also to reduce the losses of fine acceptable stock. This arrangement results in a downward swirl of the liquid mixture in the chamber 61 in such manner that the low pressure core 14 will continue on down through this chamber and a low pressure will be maintained in the liquid passing through the opening 60, by applying a sufficient vacuum to maintain subatmospheric pressure within and about the core above in the chamber 13. The diluted dirt-laden stock continues down through a cone 64, then preferably through a connection 65 which allows the stream to expand, contributing further to the eductor effect.

The operation of the arrangement including the chamber 61 may be understood from consideration of the following facts. If a dispersion containing large fast settling particles mixed with fine slower moving particles is allowed to remain for a short period of time, it will be appreciated that some particles of both types will settle but the settlings will to a large extent of course comprise the faster settling particles. However, the fine material which has been nearer the bottom will settle to some extent and occur in the sediment due to the relatively short distance which such fines will have to travel. Rejected material comprising the sediment will accordingly contain in the case of a pulp dispersion, for example, some fine desirable material along with the heavy undesirable particles. Secondary cleaning units involving dilution of this sediment are accordingly required in order to recover the otherwise wasted desirable fine material. Now, if we add the same suspension mixture to the top of a body of clear liquid, then a sharper separation is possible and the large particles may substantially all be capable of falling through the clear liquid to the bottom before any appreciable amount of the small particles reaches the bottom. The sharpness of separation is even greater if clear water flows up against the falling suspension. The fines will then be prevented from falling by the upward flow but the fast settling coarse or heavier material will settle in spite of this upward flow and be obtained as a sediment quite free of the fines. Thus it will be seen that with the arrangement of Fig. 9 the rejected stock coming down through cone 16' will pass down inside a vortex of clear water or white water coming in through inlet 63. The heavier material will thus easily be separated to the walls of chamber 61 and allowed to settle into cone 64, but the fine acceptable pulp material will not settle fast but will be returned back to the upper chamber by the curved cone 64.

In order to assure most efficient operation of the apparatus with separators of various dimensions and under varying operating conditions, the underlying theory of operation of the various parts of the separators above described will now be further explained. First, as to the vortex flow pattern in the separator, it may be noted that if there were no friction losses, the liquid would flow in what is called a free vortex, that is, one wherein the energy content of a unit of the liquid at different radial positions would be the same. Since liquid swirling at the center of a vortex tends to compress liquid against the wall, this involves a conversion of energy from pressure energy to velocity energy as a unit of the liquid moves to a position of smaller radius, until eventually one reaches a condition where all of the energy would be velocity energy and beyond this point there would be no more liquid, but merely a vacuum or gas core. The equation for such a flow system at different radii is:

$$V = \frac{k}{r}$$

where $V$ = velocity
$k$ = a constant
$r$ = radius to point under consideration

However, in actual practice, such a free vortex rarely occurs except in a very short system where the friction losses would be negligible or where velocities are very low. Instead, the liquid at smaller rotational radii loses energy by shear in passing the outer liquid for two reasons, viz.: first, for the same velocity, it has a smaller distance to travel for one revolution and hence will pass the other liquid, and secondly under the free vortex principle, the inner liquid is travelling faster. The friction losses $F$ caused by such shear are in accordance with the following equation:

$$F = \frac{4\pi k l u}{r}$$

where $k$ is a constant
$l$ is the length of the column of swirling liquid
$u$ is the viscosity
$r$ is the radius to the point under consideration It may be seen from the above equation that the liquid at a small radius near the middle loses energy very rapidly. Eventually after prolonged friction loss due to extended travel of the swirling stream, the shear of one layer of liquid past another is no longer a substantial factor and then the flow pattern equation for velocity at different radii approaches a condition shown by the following equation:

$$V = kr$$

where $V$ is a velocity at a point
$k$ is a constant
$r$ is the radius to the point under consideration In practice the vortex condition will be between the free vortex condition and that of the friction vortex. The longer the time of residence in the vortex, the farther will the vortex condition depart from the free vortex.

In centrifugal vortex separators or cleaners, the friction losses will occur to a greatest extent in two regions, viz. nearest the central core as indicated by the above friction equation and near the wall where friction shear occurs between the moving liquid and the stationary wall. But the main departure from a free vortex condition is near the core at a small radius where, according to the above friction equation, energy losses due to liquid shear are the greatest. This will tend to cause the empty core area which would be normally maintained in a free vortex, to tend to fill with low energy liquid. But since the core must be maintained free for gas removal, this liquid is drained down to the bottom as the third falling central vortex 35. Such third or innermost vortex is highly advantageous as it serves as a medium for carrying out froth, bubbles and floatated matter. While the curved form of the cone 16 at the bottom is not itself essential to the three-directional vortex, it is highly advantageous to promote efficient stripping of the heavy dirt from the stagnant layer nearest the wall from the main stream. This heavy dirt which has been thrown to the wall, falls in more slowly moving layers and the curved cone is such as to turn back fast moving liquid but not the slower moving liquid. The rejected liquid may be considered to follow a helical path toward the dirt outlet 18 as a free vortex, since the friction losses in such slowly moving liquid are relatively low. Accordingly the slope of the cone 16 at any radial position should be such as to not turn back this slow rejected liquid, and hence the curvature of the cone must be changed at different radii to compensate for both the changes in centrifugal force at varying radii and the speeding up of liquid due to the free vortex principle.

For proper action in such vortices on a liquid suspension, it is necessary that the separating power, that is the ability to throw down fine dirt, be sufficient to fairly well precipitate all unwanted particles but little of the desired suspension. This dirt separating power will be proportional to the separating forces which are in turn in proportion (a) to the square of the inlet velocity; (b) to the period of time during which the suspension is subjected to these forces adjacent to the walls of the chamber and (c) the distance through which the dirt must pass in order to be separated. In the design of the above-described three-directional vortex arrangements, the inlet velocity is made as high as possible within practical limits to give maximum separating power. The liquid is given a long period of treatment by providing a long cylindrical chamber 13. This gives ample opportunity to achieve separation, and the liquid on its downward pass is kept as a relatively thin layer against the wall in order that the distance through which the dirt must flow to the wall will be kept small.

The dirt separating power is not only dependent upon the efficiency of the apparatus in causing the dirt to migrate toward the outermost portions of the vortices adjacent the wall, but also upon the efficiency with which the dirt is thereafter separated from the main stream. Near the lower portion of the separator, the dirt may be characterized in two ways, viz.: it is in a position adjacent the wall and the liquid containing same has lost most of its initial velocity energy. The curved cone design shown at the lower part of Fig. 1 and in the larger view of Fig. 6 utilizes both of these characteristics in order efficiently to strip the dirt from the clean liquid. Centrifugal forces of the swirling liquid act at right angles to the axis of rotation. The wall in the curved cone on the other hand, can only react in pressure against the liquid in a direction normal to its surface and hence when the swirling column of liquid encounters such a cone, a reaction is set up which tends to drive the liquid away from the lower end or apex of the cone. It is this reaction of the helical flow against the cone which turns back the clean or treated liquid and drives it back toward the top of the device. The dirty liquid however, has lost so much of its velocity energy that this reaction against same is considerably less and accordingly it is not turned back, but falls due to the pressure conditions and with the aid of gravity if the device is in the upright position shown. However, if this liquid were brought to the exit in a true cone (and not along a cone with curved walls as shown) the centrifugal forces would increase as the liquid is brought to a smaller radius of rotation due to both an increase in velocity (under free vortex principle) and the reduced radius of rotation, until a point would be reached on such a straight cone where the dirt will refuse to proceed further toward the apex but will either seek an orbit or turn back with the clean liquid. In the curved cone design, however, as best shown in Fig. 6, the slope of the cone is progressively changed with the diameter, in a manner such that as the dirty liquid approaches the axis, the slope of the wall so nearly approaches the vertical that although the centrifugal forces therein have increased at the smaller radius of rotation, the liquid does not have sufficient net reaction against the wall to be driven upwardly, but tends to pass on down and out. An equation may be mathematically developed defining the curvature which such a cone should have for effective action according to these principles. Such equation (disregarding friction) is as follows:

$$h = \frac{k^2}{2_g} \left( R^{\frac{1}{2}} - r^{\frac{1}{2}} \right)$$

where $h$ is the height from the top of the curved cone down to the point of radius $r$;
$R$ is the radius at the top;
$r$ is the radius to a point on the curve;
$g$ is the gravitational constant;
$k$ is the constant from the free vortex equation; which may be computed as $$k = \frac{V}{R}$$

where R is the radius at the top of the cone and where V equals the tangential velocity (next to the wall) below which liquid at the top of the cone will follow the curved cone downwardly to the outlet, this velocity being below that at which liquid will be turned back as accepted stock flowing up to the top of the device.

In a preferred example of the device as shown in Fig. 1, the inlet velocity is 50 ft. per second, but liquid next to the wall will have velocities much lower, depending upon their proximity to the wall, and a very small amount in contact with the wall may not have any rotational velocity. This relatively stagnant or slowly moving layer becomes progressively thicker as it moves down the wall and it is into this layer that dirt is flung from the more central high velocity liquid. The cone 16 acts to make a velocity separation; liquid moving at a speed below the velocity V (1.35 ft. per second in a typical case) falls down along the curved cone and liquid above such velocity V is turned back as the upwardly moving vortex. It should be noted that the liquid which is just capable of being turned back will probably be the dirtiest part of the accepted liquid and being on the very inside of the upward moving vortex is most likely to be subject to a froth flotation effect and then later be rejected in the froth rejection stock falling down as a part of the inner downward flow 35.

Fig. 6 shows the actual dimensions which such a curved cone 16 should have, assuming that the upper end is 10" in internal diameter and the critical separating velocity V is equal to 1.35 ft. per second. The other parts as shown in Figs. 1-7 may all be made with dimensions in proportion to those indicated in Fig. 6. It will be understood that the device may be made with a separating chamber either considerably smaller, or if preferred, considerably larger than that indicated by these dimensions, provided the dimensions of the head portions and cone portions of the structures are correspondingly diminished or increased.

As to the principles involving the maintenance of the gas core, it should be noted that the high inlet velocity given by the nozzle inlet restriction tends to hold the liquid by centrifugal force against the wall of the chamber 13 leaving a void toward the center. However, with the high liquid shear which occurs, particularly adjacent to this core region, much of this velocity energy is lost until, if no special provisions were made, this core region would fill with more or less stagnant liquid. The exit at the bottom of the cone, however, continuously drains liquid which might otherwise tend to accumulate and fill the core region. Thus the core may readily be established due to the high vortex velocity and the resultant centrifugal forces, and this space is maintained empty by being continuously drained, such draining action carrying out froth and floatated matter.

In the pump for feeding the suspension to a separator such as here disclosed, there is usually enough compression of the liquid to compress gas bubbles and cause at least many of them to dissolve in the liquid. Thus it is generally insufficient to operate this apparatus with an outlet at atmospheric pressure if efficient separation of the gas is to be accomplished, since only the bubbles which are not dissolved will in general be removed, while little of the gases which have been forced into solution by the action of the pump will be separated. Gas bubbles may readily be removed centrifugally, but gases dissolved in solution require a considerable time interval in order to emerge, but the rate at which such gas will come out of solution may be greatly accelerated by reducing the hydraulic pressure to considerably below atmospheric. Then the gases become highly supersaturated and the rate of evolution of bubbles is greatly increased. The bubbles, in arriving at the core of the vortices, tend to bring with them any types of particles which will naturally adhere to bubbles. The gas is prevented from leaving the device with the cleaned stock at the top by the trap arrangement within the headpiece, which allows the outermost accepted liquid in effect to leak away from the core, but without drawing the liquid from the region immediately adjacent the core. Thus the gases and material which are brought into or near the core are removed by the eductor effect of the rejected stock and by vacuum at the bottom of the device. Units may be designed to operate according to the foregoing principles for varying inlet pressures and varying rates of flow. Designs which are presently preferred may be operated as follows:

|  | Recommended Operating Condition | Range |
| --- | --- | --- |
| Inlet Pressure | 30 p. s. i | 20-40 |
| Accepted Stock Outlet Vacuum | 19″ Hg | 15-23 |
| Core Vacuum | 28″ Hg | 20-29 |
| Reject Vacuum | 27″ Hg | 20-29 |

Flow conditions under the recommended operating conditions are as follows:

Inlet flow=200 U. S. gallons per minute
Accepted flow=180 U. S. gallons per minute
Reject flow=20 U. S. gallons per minute If the units are used without vacuum connections, they may be operated as follows:

|  | Recommended Operating Condition | Range |
| --- | --- | --- |
| Inlet Pressure | 40 p. s. i | 20-50 |
| Outlet Pressure | 1½ p. s. i | 1-5 |
| Core Vacuum | 1″ Hg |  |
| Reject Vacuum | 0 | 0 |

Flow conditions under the above recommended operating conditions are as follows:

Inlet flow=200 U. S. gallons per minute
Accepted flow=185 U. S. gallons per minute
Reject flow=15 U. S. gallons per minute Although certain particular embodiments of the invention are herein disclosed for purposes of explanation, various further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Method for separating undesired particles and gases from pulp suspensions containing same, which comprises forming a first helical vortex thereof extending for a substantial length, then at a first reversal region causing the innermost portions of said vortex to be deflected inwardly to form a second helical vortex surrounded by said first vortex, such second vortex extending in the reverse direction for a substantial distance to a second reversal region, causing the inner portions of such second vortex to be deflected inwardly and back toward the first reversal region as a third and innermost flow surrounded by the second vortex, withdrawing under subatmospheric pressure from said first reversal region the outermost portions of the first vortex containing undesired heavier particles along with the content of the third flow, said pressure being maintained sufficiently low and the vortex velocities sufficiently high that a gas core of subatmospheric pressure will be maintained along the axis of the vortices from which froth, bubbles and gas and lighter undesired particles are withdrawn along with the said heavier particles, and discharging the outer portion of the second vortex, comprising the accepted treated portion of the suspension, from said second vortex at said second reversal region.

2. Method for separating undesired particles and bubbles from suspensions containing same, which comprises: forming a first helical vortex thereof extending for a substantial length; then at a first reversal region causing the innermost portions of said vortex to be deflected inwardly to form a second helical vortex surrounded by said first vortex, such second vortex extending in the reverse direction for a substantial distance to a second reversal region; causing the inner portions of such second vortex to be deflected inwardly and back toward the first reversal region as a third and innermost flow surrounded by the second vortex; discharging from said first reversal region the outermost portions of the first vortex containing undesired heavier particles along with the content, including bubbles, of the third flow, the vortex velocities being maintained sufficiently high that a gas core will be maintained along the axis of the vortices; and discharging the outer portion of the second vortex, comprising the accepted treated portion of the suspension, from said second vortex at said second reversal region.

3. Method for separating undesired particles and gases from suspensions containing same, which comprises: forming a first helical vortex thereof extending for a substantial length; then at a first reversal region causing the innermost portions of said vortex to be deflected inwardly to form a second helical vortex surrounded by said first vortex, such second vortex extending in the reverse direction for a substantial distance to a second reversal region; causing the inner portions of such second vortex to be deflected inwardly and back toward the first reversal region as a third and innermost flow surrounded by the second vortex; withdrawing under a low subatmospheric pressure from said first reversal region the outermost portions of the first vortex containing undesired heavier particles along with the content of the third flow, said pressure being maintained sufficiently low and the vortex velocities sufficiently high that a gas core of subatmospheric pressure will be maintained along the axis of the vortices from which froth, bubbles and gas are withdrawn along with the said heavier particles; and discharging the outer portion of the second vortex, comprising the accepted treated portion of the suspension, from said second vortex at said second reversal region, and at a subatmospheric pressure which is not so low as that at which the heavier particles are withdrawn.

4. Apparatus for separating undesired particles and gases from liquid mixtures containing same, which comprises: an elongated cylindrical chamber; inlet means near the first end thereof for injecting the mixture to form a first helical vortex around on the inside walls of the chamber and extending to the other end thereof, a generally conical coaxial cavity being provided at said other end and having an outlet at its apex, said cavity having walls which, at the upper portions thereof, curve inwardly rapidly and somewhat downwardly and merging with lower wall portions of the cavity which curve rapidly downwardly but substantially less inwardly, the curvatures, being such as to deflect the innermost portions of the helical flow inwardly and upwardly to form a second and upwardly directed helical vortex surrounded by the first vortex, while the outermost portions of the first vortex are allowed to pass down out through the outlet; outlet means near the first end of the apparatus for discharging accepted stock from said second vortex; and means for subjecting both outlets to a subatmospheric pressure.

5. Apparatus for separating undesired particles and gases from liquid mixtures containing same, which comprises: an elongated cylindrical chamber; inlet means near the first end thereof for injecting the mixture to form a first helical vortex around on the inside walls of the chamber and extending to the other end thereof, a generally conical coaxial cavity being provided at said other end and having an outlet at its apex, said cavity having walls which, at the upper portions thereof, curve inwardly rapidly and somewhat downwardly and merging with lower wall portions of the cavity which curve rapidly downwardly but substantially less inwardly, the curvatures being such as to deflect the innermost portions of the helical flow inwardly and upwardly to form a second and upwardly directed helical vortex surrounded by the first vortex, while the outermost portions of the first vortex are allowed to pass down out through the outlet; means connected to said outlet to subject same to a subatmospheric pressure sufficient to maintain a gas core also of subatmospheric pressure up through said chamber; means providing a surface against which said second vortex impinges at a region near the first end of the apparatus; another chamber surrounding the region of said surface; and means for bringing such other chamber into communication with the outer portions of said second vortex for permitting discharge of a controlled portion only therefor into said other chamber, the parts being so shaped and positioned that the remaining and central portions of the second vortex are deflected back as a third vortex surrounding said gas core and discharging under the subatmospheric pressure at said outlet at said other end of the apparatus.

6. Apparatus for separating undesired particles and gases from liquid mixtures containing same, which comprises: an elongated cylindrical chamber; inlet means near the first end thereof for injecting the mixture to form a first helical vortex around on the inside walls of the chamber and extending to the other end thereof, a generally conical coaxial cavity being provided at said other end and shaped to deflect the inner portions of said vortex to form a reversely directed second vortex surrounded by the first vortex and returning to the first end of the apparatus, an outlet being provided at the apex of such generally conical cavity for discharging the outer portions of the first vortex; means connected to said outlet to subject same to a subatmospheric pressure sufficient to maintain a gas core also of subatmospheric pressure up through said chamber; a blunt generally conical surface against which said second vortex impinges at the region of the first end of the apparatus; and tubular means through which said second vortex passes just prior to impingement on said blunt conical surface, said tubular means being positioned and shaped to provide an annular discharge opening adjacent said blunt conical surface for discharging the outermost portions of the second vortex while the innermost portions thereof are deflected back as a third and innermost vortex surrounding said gas core and discharging under the subatmospheric pressure at said outlet at said other end of the apparatus.

7. Method for separating undesired particles and gases from suspensions containing same, which comprises: forming a first helical vortex thereof extending for a substantial length; then at a first reversal region causing the innermost portions of said vortex to be deflected inwardly to form a second helical vortex surrounded by said first vortex, such second vortex extending in the reverse direction for a substantial distance to a second reversal region; causing the inner portions of such second vortex to be deflected inwardly and back toward the first reversal region as a third and innermost flow surrounded by the second vortex; withdrawing adjacent said first reversal region an outermost portion of the first vortex containing undesired heavier particles; also withdrawing under a low subatmospheric pressure from said first reversal region said innermost flow, said pressure being maintained sufficiently low and the vortex velocities sufficiently high that a gas core of subatmospheric pressure will be maintained along the axis of the vortices from which gas is withdrawn along with said third flow; and discharging the outer portion of the second vortex, comprising the accepted treated portion of the suspension, from said second vortex at said second reversal region.

8. Apparatus for separating undesired particles and gases from liquid mixtures containing same, which comprises: an elongated cylindrical chamber; inlet means near the first end thereof for injecting the mixture to form a first helical vortex around on the inside walls of the chamber and extending to the other end thereof, a generally conical coaxial cavity being provided at said other end and having an outlet at its apex; outlet means near the first end of the apparatus for discharging accepted stock; a second cylindrical chamber into which one end of the said apex outlet is directed; a tangential inlet for introducing liquid adjacent said end of said second chamber; and means at the other end of said second chamber for dischargnig liquid containing the undesired particles from the outer portions of a vortex formed in said second chamber.

9. Apparatus in accordance with claim 5 and in which said means for bringing such other chamber into communication with the outer portions of said second vortex comprises a perforated cylindrical member surrounding the upper portion of the second vortex, such member constituting a screen allowing passage therethrough of pulp particles and preventing passage therethrough of undesired coarser particles.

References Cited in the file of this patent

UNITED STATES PATENTS

| 2,102,525 | Freeman | Dec. 14, 1937 |
| 2,655,263 | Chisholm | Oct. 13, 1953 |

FOREIGN PATENTS

| 238,137 | Switzerland | of 1945 |
| 607,787 | Great Britain | of 1948 |